Figure 3:
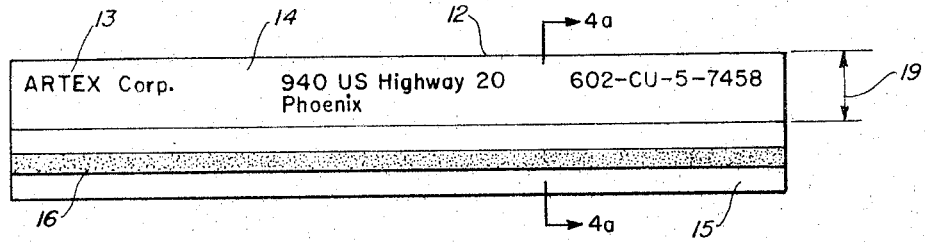

Jan. 24, 1967  R. C. STIEFEL  3,299,556
DATA LISTING DEVICE

Filed March 3, 1965  3 Sheets-Sheet 1

ARIZONA

| | | |
|---|---|---|
| ARTEX Corp. | 940 US Highway 20<br>Phoenix | 602-CU-5-7458 |
| Blonder & Sanzona | 250-30 Nassau St.<br>Arizona City | 602-BR-9-3098 |
| House of Suburbia, Inc. | 30 Highland Ave.<br>Phoenix | 602-VA-9-0500 |

CALIFORNIA

| | | |
|---|---|---|
| Jaquet, Charles | 370 Kinnard Ave.<br>Beverly Hills | 213-OR-6-2279 |
| Lescott Transportation Co. | 50-63 Hollywood Blvd.<br>Carmel | 408-PE-6-7334 |
| Maxon Insurance Co. | 110 Trafalgar St.<br>Oakland | 415-TR-8-2345 |
| Peerless Printers, Inc. | 20-35 Eastern Blvd.<br>Vallejo | 707-CR-5-9006 |
| Riviera Novelties, Inc. | 87 West 110 St.<br>Palo Alto | 415-ST-6-8450 |
| Turner, Woodrow H. | 20-81 Delaware Rd.<br>Pasadena | 213-PA-5-6743 |

COLORADO

| | | |
|---|---|---|
| Bernanos, Richard | 1005 Florida Ave.<br>Colorado Springs | 303-KO-4-9735 |
| Finnigan, Arthur C. | 75 N. Hancock Ave.<br>Denver | 303-BI-8-4509 |
| Georgeson Bros. | 8998 Frontier St.<br>Denver | 303-AR-2-4578 |
| Zanzibar Metal Corp. | 237 South St.<br>Carbondale | 303-HA-6-3845 |
| Zoological Institute | 387 Elm Tree Lane<br>Denver | 303-CR-1-5647 |

*Fig. 1*

INVENTOR:
RUDY C. STIEFEL
BY James Spool
ATTORNEY.

| ARIZONA | | |
|---|---|---|
| ARTEX Corp. | 940 US Highway 20<br>Phoenix | 602-CU-5-7458 |
| Blonder & Sanzona | 250-30 Nassau St.<br>Arizona City | 602-BR-9-3098 |
| House of Suburbia, Inc. | 30 Highland Ave.<br>Phoenix | 602-VA-9-0500 |

| CALIFORNIA | | |
|---|---|---|
| Jaquet, Charles | 370 Kinnard Ave.<br>Beverly Hills | 213-OR-6-2279 |
| Lescott Transportation Co. | 50-63 Hollywood Blvd.<br>Carmel | 408-PE-6-7334 |
| Maxon Insurance Co. | 110 Trafalgar St.<br>Oakland | 415-TR-8-2345 |
| Peerless Printers, Inc. | 20-35 Eastern Blvd.<br>Vallejo | 707-CR-5-9006 |
| Riviera Novelties, Inc. | 87 West 110 St.<br>Palo Alto | 415-ST-6-8450 |
| Turner, Woodrow H. | 20-81 Delaware Rd | 213-PA-5-6743 |

| COLORADO | | |
|---|---|---|
| Bernanos, Richard | 1005 Florida Ave.<br>Colorado Springs | 303-KO-4-9735 |
| Finnigan, Arthur C. | 75 N. Hancock Ave.<br>Denver | 303-BI-8-4509 |
| Georgeson Bros. | 8998 Frontier St.<br>Denver | 303-AR-2-4578 |
| Zanzibar Metal Corp. | 237 South St.<br>Carbondale | 303-HA-6-3845 |
| Zoological Institute | 387 Elm Tree Lane<br>Denver | 303-CR-1-5647 |

Fig. 2

United States Patent Office 3,299,556
Patented Jan. 24, 1967

3,299,556
DATA LISTING DEVICE
Rudy C. Stiefel, 860 5th Ave., New York, N.Y. 10021
Filed Mar. 3, 1965, Ser. No. 436,861
1 Claim. (Cl. 40—124)

This invention relates to means for preparing data listings which must be republished periodically in order to incorporate changes which have occurred in the individual data items. More particularly, the present invention relates to means for preparing such listings for reproduction.

Listings of the type to which the present invention may be advantageously applied would be, for example, directories showing location or telephone numbers of personnel in an organization; membership, customer or registration lists; indices, etc. Such listings generally are useful only as long as they are current, and the issuers of such listings are usually faced with the problem of making necessary revisions economically and without disturbing the correct items.

The concept of the "perpetual directory" is an old one, and the prior art is replete with devices which have been used to display listings of data and which permit individual data items to be removed and replaced.

As a general rule, however, these devices suffer from one or more deficiencies which have limited their usefulness, namely auxiliary frames, backing pages, or connector links are needed to hold the data-bearing cards together; the mechanical means used to hold the devices together are often fragile and not well adapted to substantial numbers of removals and replacements; or the bulk and dimension added by the auxiliary devices do not permit reproduction of the listing page by economical means.

It is, therefore, a principal object of the present invention to provide means whereby the individual data items included on a master copy of a listing page may be inserted in or removed from the master copy with simplicity and economy.

Another object of the present invention is to provide means for forming a master copy of a listing page from cards or sheets containing the individual data items, without the need for auxiliary accessory devices external to the data-containing cards or sheets.

A further object of the present invention is to provide a master copy of a listing page which can be used in any duplicating or copying machine.

Figure 5:
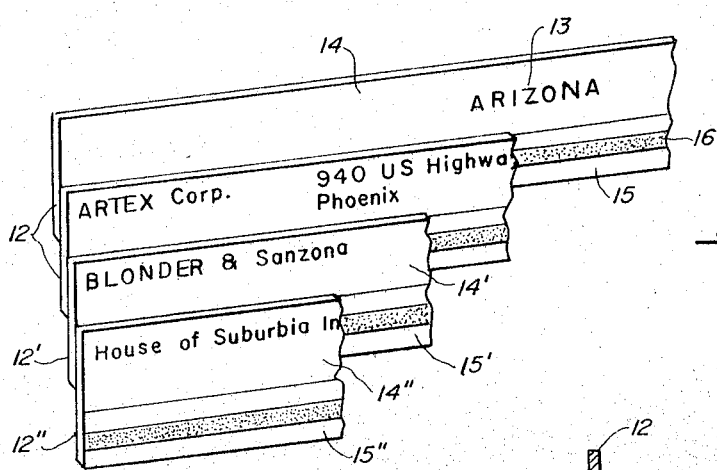
Figures 4A, 4B:
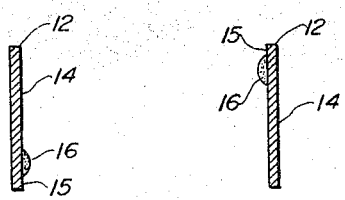
Figure 7:
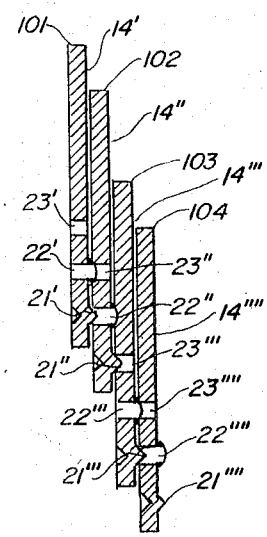
Figures 6, 6B:
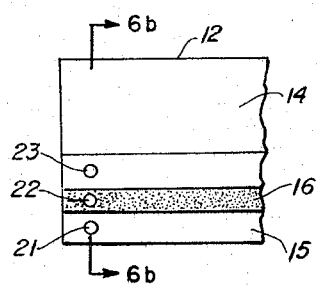

These and other objects are attained in the manner described herein, and illustrated in the accompanying drawing in which:

FIG. 1 shows a page of the listing.
FIG. 2 shows the front face of the master copy.
FIG. 3 shows the front view of one embodiment of the data-bearing card.
FIGS. 4a and 4b show alternative embodiments of the data-bearing card, at section A—A of FIG. 3.
FIG. 5 is a view of the details of the master copy assembly.
FIG. 6 shows a front view of one end of another embodiment of the data-bearing card.
FIG. 6b shows section B—B of FIG. 6.
FIG. 7 shows details of master copy assembly using the structures of FIGS. 6 and 6b.

The present invention, as shown in FIGS. 1 and 2, takes the form of a master copy 10 of a page 11 of a listing. The master copy 10 is made up of a plurality of cards 12 on one surface of which the data 13, to be displayed in the listing 11, is imprinted by any convenient means, such as by hand or with a typewriter.

The data-bearing cards 12 may be of any material commonly used for office purposes, such as bond paper, card stock, or plastic, and may be of any size suited to the particular listing with which it is to be used.

The card 12 shown in FIG. 3 consists of data portion 14 in which the data 13 is entered and an adhesive portion 15 to which, in accordance with the present invention, a chemical substance 16, which is pressure-sensitive and can be removed and reapplied several times, such as, for example, the well known adhesives used on "masking" tape, is applied. In the embodiment of the present invention shown in FIG. 4a, the adhesive portion 15 is on the same face of the card 12 as is the data portion 14. In another embodiment of the invention, shown in FIG. 4b, the adhesive portion 15 is on the surface of card 12 not occupied by data portion 14. It is obvious also that the adhesive material may also be applied at both locations.

The master copy 10 of the listing page is assembled in accordance with the present invention, by arranging the cards 12 in a row, with adjacent cards partially overlapping as shown in FIG. 5. Considering the adjacent cards 12' and 12" in FIG. 5, it is seen that, in accordance with the present invention, the adhesive portion 15' is within the overlap, and the cards 12' and 12" are adjusted so that the data portions 14' and 14" are contiguous. Slight pressure applied to each card will cause the adhesive substance of the adjacent card to hold the two cards (e.g., cards 12' and 12") together.

It can be seen that the present invention provides for the utmost flexibility in displaying items with differing amounts of data, since cards with data portions of differing heights 19 may be used to suit the amount of data comprising any particular data item. Thus it can be seen that the number of cards 12 in the master copy 10 of each listing page will depend upon (a) the respective heights 19 of the data portion 14 of the several cards used, and (b) the overall height 20 of the listing page 11.

In another embodiment of the invention, as shown in FIGS. 6 and 6b, one surface of the card carries a locator key 21 and locator holes 22 and 23 at each end. These features are used as shown in FIG. 7. By engaging the several locator keys 21', 21", 21''', and 21'''' in the appropriate locator holes 22', 22", 22''', 22'''', 23', 23", 23''', or 23'''', differing amounts of the data portions 14 of each of the adjacent cards 101, 102, 103, and 104 are exposed. It is obvious from the foregoing that these locator keys and locator holes may be appropriately positioned on the cards not only at the ends, but at any point from the ends.

In use, a master copy of each page of the listing is prepared in the manner set forth above. The pages may then be reproduced by any suitable printing means, such as, for example, photo offset, or any suitable copying means, such as, for example, xerography.

A unique feature of the present invention is that the master copy 10 is an assembly of the data bearing cards 12 only, and no accessory connecting or supporting devices are needed.

The principal advantages which derive from the present invention become apparent when it is desired to incorporate a change in any of the data items appearing on the master copy. For example, when one or more data items in a private telephone directory require revision, such as, for example, a change in a telephone number or address, the revised version of the data item is imprinted on the data portion of a new card. The card bearing the incorrect data is removed from the master copy by literally peeling away the preceding and succeeding card in the row.

The card bearing the revised data item is then inserted into the master copy, in place of the card bearing the incorrect data items, by simply attaching the new cards to the preceding and succeeding cards in the manner already described for the original preparation of the master copy. The revised page master is now ready for reproduction, with the positive assurance that no copying errors have entered into the unchanged data items.

Similarly, when additional data items must be included in the listing between items already listed on a full page, use of the present invention facilitates carryover of excess items as a unit without disassembly to the next page, or the starting of a new page. Any number of contiguous cards 12, coupled at their adhesive portions in accordance with the present invention, may be moved from page to page as a group, and if necessary, may be used to start the master copy of a new page, whichever is most desirable to the user.

Although the several embodiments described in the specification have been selected because they best illustrate the novelty and utility of the present invention, it is understood that persons skilled in the art may well devise and utilize variations of said embodiments, and other embodiments, without departing from the spirit and scope of the present invention as defined in the claim as hereinafter set forth.

What is claimed is:

A master copy of a page for listing a plurality of data items, comprising, in combination, a plurality of cards arranged in a row, holding means for maintaining said cards in said arrangement, said cards each having a data portion and an adhesive portion, said holding means comprising an adhesive substance affixed to said adhesive portion, said cards each having at least one locator key and at least one locator hole, said arrangement comprising said cards adjacent one another in partially overlapping relationship such that said adhesive portion is included within said overlap, said data portions of said adjacent cards are contiguous, and each said locator key on each said card is engaged in one said locator hole in one said adjacent card.

References Cited by the Examiner

UNITED STATES PATENTS

| 2,232,732 | 2/1941 | Rogers | 40—140 |
| 2,699,103 | 1/1955 | Stasikewich | 40—125 X |

EUGENE R. CAPOZIO, *Primary Examiner.*

W. J. CONTRERAS, *Assistant Examiner.*